United States Patent [19]
Dogliotti et al.

[11] 3,976,466
[45] Aug. 24, 1976

[54] FERTILIZER MADE FROM NITROCELLULOSE AND PROCESS OF MAKING SAME

[75] Inventors: Libera M. Dogliotti, Sherborn, Mass.; Ronald C. Chalk, London, Canada; Leo A. Spano, Cumberland, R.I.; Dale H. Sieling, Natick, Mass.

[73] Assignee: The United States of America as represented by the Secretary of the Army, Washington, D.C.

[22] Filed: Dec. 17, 1974

[21] Appl. No.: 533,577

[52] U.S. Cl. .................................. 71/25; 71/57; 149/49
[51] Int. Cl.² .......................................... C05F 7/02
[58] Field of Search ............... 71/25, 26, 40, 42, 1, 71/57; 149/19.8, 48, 49, 60, 94, 100

[56] References Cited
UNITED STATES PATENTS

| | | | |
|---|---|---|---|
| 340,276 | 4/1886 | Bielefeldt | 149/49 |
| 1,933,445 | 10/1933 | Murdock | 71/25 |
| 3,240,586 | 3/1966 | Harris | 71/40 X |
| 3,422,170 | 1/1969 | Brooks et al. | 149/19.8 X |
| 3,563,723 | 2/1971 | Sackett, Sr. et al. | 71/40 X |

*Primary Examiner*—Charles N. Hart
*Assistant Examiner*—Robert H. Spitzer
*Attorney, Agent, or Firm*—Nathan Edelberg; Robert P. Gibson; Charles C. Rainey

[57] ABSTRACT

Nitrocellulose is reacted with ammonium hydroxide to produce a mixture of ammonium nitrate with various degradation products derived from cellulose, the mixture being useful as fertilizer either in the form of an aqueous slurry or in dry powdery or granular form.

5 Claims, No Drawings

FERTILIZER MADE FROM NITROCELLULOSE AND PROCESS OF MAKING SAME

The invention described herein may be manufactured, used, and licensed by or for the Government for governmental purposes without the payment to us of any royalty thereon.

BACKGROUND OF THE INVENTION

This invention relates to a process of making a fertilizer from nitrocellulose waste and more particularly from nitrocellulose fines which are produced in the manufacture of nitrocellulose for incorporation in explosives, plastics, and for other purposes, and which have been one cause of stream pollution. The invention also relates to the fertilizer produced from nitrocellulose.

In the manufacture of nitrocellulose for use in making explosives or plastics or for other purposes a sizeable quantity of nitrocellulose is discarded or lost in the form of fines which are discharged into ground streams in the form of aqueous slurries, thereby causing pollution problems. In the past, this has not been considered a serious problem. But today, with increasing emphasis being placed on cleaning up the environment, it has become important to find ways to avoid loading ground streams with waste matter, especially non-biodegradable wastes. It is desirable, when economically possible, to convert waste materials into useful products.

An object of the present invention is to provide a process of converting nitrocellulose waste into useful fertilizers.

A further object is to provide a method of converting aqueous suspensions of nitrocellulose fines into aqueous solutions of ammonium nitrate and slurries thereof with degradation products derived from cellulose.

Another object is to produce useful fertilizers in both liquid and solid forms from nitrocellulose waste.

Other objects and advantages will appear from the following description, and the novel features will be particularly pointed out in connection with the appended claims.

SUMMARY OF THE INVENTION

Nitrocellulose, especially in the form of an aqueous slurry of nitrocellulose fines, is reacted with ammonium hydroxide to produce a mixture of ammonium nitrate with various degradation products derived from cellulose, the mixture being useful as fertilizer either in the form of an aqueous slurry or in dry powdery or granular form.

DESCRIPTION OF THE PREFERRED EMBODIMENTS

It is to be understood that percentages stated hereinafter and in the claims refer to percentages by weight, unless otherwise indicated.

We have found that nitrocellulose can be completely denitrated by reacting it with aqueous ammonia solutions in liquid form. When ammonium hydroxide reacts with fully nitrated cellulose, three moles of ammonium hydroxide are required to react with one mole of cellulose nitrate, which contains three nitrate groups per glucose unit. Thus the stoichimetric molar ratio of ammonium hydroxide to nitrocellulose would be $(3\times35)/(297)$ or $0.354:1$. As a result of the reaction of the ammonium hydroxide with nitrocellulose, ammonium nitrate is produced in the aqueous solution. The cellulose backbone of the nitrocellulose is degraded during the denitration or denitrification, resulting in a mixture of relatively low molecular weight degradation derivates of cellulose. Thus, aqueous suspensions of nitrocellulose waste can be mixed with ammonium hydroxide in suitable proportions and reacted until substantially all of the nitrocellulose waste is converted to a mixture of ammonium nitrate, a very good fertilizer material, and readily biodegradable organic materials. The ammonium nitrate may be separated from these materials, but also may remain mixed with the biodegradable materials either in a slurry or in dry form. The biodegradable organic materials do not interfere with the utilization of the ammonium nitrate as a fertilizer other than to dilute the ammonium nitrate.

Although the reaction of ammonium hydroxide with nitrocellulose may be carried out over a rather wide range of concentrations of the reactants and temperatures, the time required to accomplish the complete removal of the nitrate groups from the nitrocellulose and degradation products thereof varies according to the molar ratio of the reactants and the reaction temperature. We like to conduct the reaction so as to obtain complete removal of the nitrate groups from the nitrocellulose within 24 hours and preferably in an appreciably shorter time. We have found it to be possible to do this by employing molar ratios of ammonium hydroxide to nitrocellulose of from about 4:1 to about 26:1 at the inception of the reaction. We also have found it preferable to employ aqueous ammonium hydroxide solutions having concentrations of from about 5 percent to about 30 percent of ammonium hydroxide. Further, we have found it preferable to carry out the reaction of the aqueous ammonium hydroxide with the nitrocellulose at temperatures from about 70°C. to about 75°C. However, lower temperatures may be employed, particularly if the concentration of the ammonium hydroxide and the molar ratio of ammonium hydroxide to nitrocellulose are increased appreciably above the preferred ranges stated above. And the temperature may be as high as the boiling temperature of the ammonium hydroxide solution, if desired, although the higher the temperature the greater the energy cost, which may make the process less economically feasible at higher temperatures. At temperatures above 75°C., the molar ratio of ammonium hydroxide to nitrocellulose may be decreased to less than 4:1, if desired, while still accomplishing substantially complete removal of the nitrate groups from the nitrocellulose, provided there is at least a stoichiometric quantity of ammonium hydroxide for the nitrate groups in the nitrocellulose present in the aqueous solution of ammonium hydroxide.

Although the process of the invention may be carried out with any nitrocellulose, it is particularly applicable to nitrocelluloses having from about 2½ to 3 nitrate groups per glucose unit in the nitrocellulose chain since these nitrocelluloses are the types commonly produced commercially and they are non-biodegradable.

The following examples will serve to illustrate the process of the invention. It is to be understood that these examples are not intended to be limitative of the invention but only illustrative of the best mode for carrying out the invention known to the inventors.

EXAMPLE I

Nitrocellulose in an aqueous slurry obtained from an ammunition manufacturing plant was filtered through Whatman No. 2 filter paper using a Buchner funnel and the nitrocellulose fines deposited on the filter paper were dried in a vacuum oven at 50°C. until they reached a constant weight. Five grams of the dried nitrocellulose were suspended to 100 ml of 10% ammonium hydroxide, giving a molar ratio of ammonium hydroxide to nitrocellulose of 17.0:1. Four such mixtures were heated for different lengths of time with stirring at 73° ± 1°C. The reaction mixtures were cooled to room temperature and filtered through tared 0.22 μm solvinert Millipore filters. The residual solids removed by the filters were dried to constant weights in a vacuum oven at 50°C. and examined by means of an infrared absorption procedure which was found useful for determining the amount of nitrocellulose or other nitrated organic matter present in a residue of solids. The filtrate was similarly examined for each sample and found to be free of nitrocellulose.

In making such determinations of nitrocellulose content, the solid residue was dissolved in a known volume of acetone and the absorbance of the acetone solution was measured at the 825 cm$^{-1}$ frequency. For low, medium, and high concentrations 0.5, 0.103, or 0.04 mm sodium chloride cells, respectively, were used. The concentration of nitrated organic matter, determined as nitrocellulose, was obtained from a straight line calibration curve obtained by plotting absorbance readings vs. concentration of standard nitrocellulose solutions. In cases where considerable amounts of inorganic nitrate could be present, the absorbance measurements were taken at the 1,650 cm$^{-1}$ frequency using tetrahydrofuran as solvent. The concentration of nitrocellulose was obtained from a previously prepared calibration curve.

Employing the above-described method for determining the amount of nitrocellulose or other nitrated organic matter present in the residue, the results in Table 1 were obtained for the residues from the above-described reaction mixtures heated for different lengths of time in the manner described.

Table 1

| Reaction Time (hr.) | Recovered Solids (%) | Nitrated Organic Matter as Nitrocellulose |
|---|---|---|
| 4 | 10.0 | Positive |
| 8 | 3.2 | None |
| 16 | 1.5 | None |
| 23 | 1.0 | None |

It is apparent that under the conditions employed in reacting nitrocellulose with aqueous ammonium hydroxide in this series of tests, a reaction time of about 8 hours or more is required to substantially completely decompose the nitrocellulose and destroy all nitrated organic matter.

EXAMPLE II

Different masses of dried nitrocellulose prepared as in Example I were suspended in 100 ml of aqueous ammonium hydroxide of different concentrations to give concentrations of nitrocellulose as shown in Table 2. The different samples were heated at 73° ± 1°C. for different periods of time as shown in Table 2. At the end of each time period selected, the reaction mixture was cooled to room temperature and filtered through a tared 0.22 μm solvinert Millipore filter as in Example I and the residual solids removed by the filter were dried to constant weights in a vacuum oven at 50°C. and examined by means of the infrared absorption procedure described in Example I to determine the amount of nitrocellulose or other nitrated organic matter present in the residues of solids. The cooled reaction mixture and the filtrate in each case contained a substantial quantity of ammonium nitrate. The filtrates were also examined by the infrared absorption procedure and found free of nitrocellulose.

The reaction mixtures, following cooling thereof, were employed for fertilizing various plants. Also, some of the reaction mixtures were evaporated to dryness and the resulting dry powdery or granulated solid mixtures were used as fertilizers. Those with zero nitrated organic matter as nitrocellulose were particularly effective as fertilizers.

Table 2

| NH$_4$OH Concentration (%) | Nitrocellulose Concentration (%) | Molar Ratio NH$_4$OH:Nitrocellulose | Reaction Time (Hr.) | Recovered Solids (%) | Nitrated Organic Matter as Nitrocellulose (%) |
|---|---|---|---|---|---|
| 5 | 10 | 4.2:1 | 12 | 12.9 | 4.0 |
| 10 | 5 | 17.0:1 | 8 | 3.0 | 0 |
| 10 | 10 | 8.5:1 | 8 | 5.8 | 1.6 |
| 10 | 10 | 8.5:1 | 10 | 3.3 | 0 |
| 10 | 10 | 8.5:1 | 12 | 1.7 | 0 |
| 15 | 5 | 25.5:1 | 12 | 0.9 | 0 |
| 15 | 15 | 8.5:1 | 7 | 4.9 | 0.8 |
| 15 | 10 | 12.8:1 | 4 | 12.2 | 5.2 |
| 10 | 20 | 4.2:1 | 24 | 3.4 | 0 |

It is apparent from the results in Table 2 that the molar ratio of ammonium hydroxide to nitrocellulose may be varied over a rather wide range and still produce substantially complete destruction of nitrocellulose or other nitrated organic matter, provided the temperature of reaction and the time period over which the reaction is carried out are sufficiently high and long, respectively. In general, the lower the molar ratio of ammonium hydroxide to nitrocellulose, the longer the time required at a given temperature of reaction to completely destroy the nitrocellulose. Similarly, the lower this molar ratio, the higher the temperature of reaction required to destroy all of the nitrocellulose in a given reaction time. Conversely, the higher the molar ratio of ammonium hydroxide to nitrocellulose, the shorter the period of time required at a given reaction temperature to completely destroy the nitrocellulose; and the higher this molar ratio, the lower the reaction temperature required to destroy all of the nitrocellulose in a given reaction time.

The present invention is very useful for preventing the pollution of ground streams with wash waters and other effluents from nitrocellulose manufacturing plants containing nitrocellulose fines which may be nonbiodegradable. The invention also provides an excellent source of ammonium nitrate or mixtures thereof with degraded molecular species from cellulose which do not interfere with the effectiveness of the ammonium nitrate as fertilizer. Fertilizers prepared in accordance with the invention may be employed in the form of slurries or as the dried powdery or granular solids. Such fertilizer slurries have been shown to be non-toxic to plants and to promote growth by plants.

It will, of course, be apparent that slurries of the cellulose degradation products together with the ammonium nitrate and any excess ammonium hydroxide may be discarded by dumping them into the sea or even into rivers where one would not be concerned about the effects thereof on the B.O.D. of the water body or on the fertilizing of algae. Thus, the net result would be the conversion of the effluent from nitrocellulose plants into a form which would be relatively non-toxic to animal life.

It will be understood, of course, that various changes in the details and materials which have been herein described in order to explain the nature of the invention, may be made by those skilled in the art within the principle and scope of the invention.

We claim:

1. A process of converting waste nitrocellulose into a fertilizer which comprises the steps of:
   a. forming a mixture of finely divided particles of nitrocellulose with a solution of ammonium hydroxide, the ammonium hydroxide in said solution being in a molar ratio to said nitrocellulose of from about 4:1 to about 26:1 and being in a concentration of from about 5 percent to about 30 percent of said solution, and
   b. reacting said mixture at a temperature of from about 70 to about 75 degrees Centigrade and for a length of time sufficient for said ammonium hydroxide to remove substantially all of the nitrate groups from said nitrocellulose by denitration of said nitrocellulose and to produce ammonium nitrate in said solution of ammonium hydroxide, whereby a liquid fertilizer in the form of a slurry is produced comprising said ammonium nitrate and degradation products formed by degradation of the cellulose backbone of said nitrocellulose.

2. A process according to claim 1, wherein said slurry is concentrated by evaporation, excess ammonia being recovered from the vapors from said slurry and a fertilizer material comprising a mixture of ammonium nitrate and biodegradable degradation products of cellulose being obtained as a concentrated aqueous slurry.

3. A process according to claim 1, wherein said slurry is subjected to a drying step, excess ammonia being recovered from the vapors from said slurry and a fertilizer material comprising a mixture of ammonium nitrate and biodegradable degradation products of cellulose being obtained as a residue of dried solids.

4. A solid fertilizer produced according to the process of claim 3.

5. A liquid fertilizer produced according to the process of claim 1.

* * * * *